Figure 1:
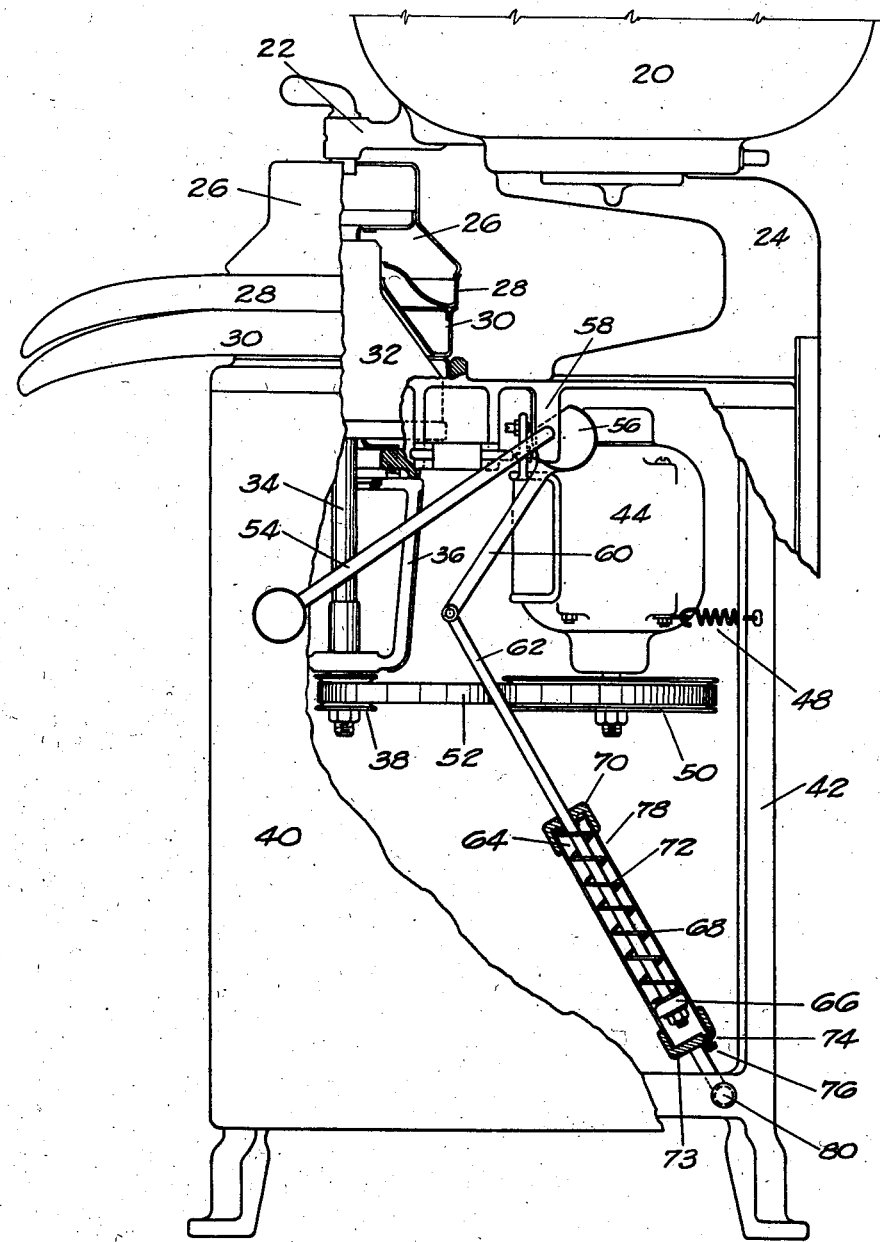

Aug. 28, 1945.   R. W. MUERLE   2,383,671
STARTING MECHANISM AND THE LIKE
Filed April 1, 1942   2 Sheets-Sheet 2

Richard W. Muerle INVENTOR.
BY
Attorney

Patented Aug. 28, 1945

2,383,671

UNITED STATES PATENT OFFICE 2,383,671

STARTING MECHANISM AND THE LIKE

Richard W. Muerle, Springfield, Ill., assignor to Montgomery Ward & Co. Incorporated, Chicago, Ill., a corporation of Illinois Application April 1, 1942, Serial No. 437,219

12 Claims. (Cl. 74—242.15)

This invention is directed primarily to the provision of means for relieving the motor of the starting load of the mechanism driven thereby, until the motor has come up to normal speed, and then gradually imparting the starting load of the driven mechanism on the motor.

In the operation of such devices as electrically driven cream separators, the operating mechanism has considerable inertia, and the starting load for the separator bowl mechanism and the motor is excessive. This requires an extremely high armature current, a current which is frequently beyond the capacity of ordinary house wiring. Since electrically driven cream separators are generally operated on the ordinary house current, the overload attendant to starting the device frequently causes fuses to blow, and therefore presents not only a serious fire hazard but expense and inconvenience of replacing the fuses when this happens.

It is an object of this invention to eliminate the high surge of current by relieving the motor of all, or at least a substantial portion, of the belt load before starting the motor; and after the motor has come up to a substantial operating speed, gradually restore the load on the motor over a predetermined time period.

In this connection, it is an object to provide a mechanism whereby the motor is disconnected from the belt load in the operation of throwing the switch to start the motor, and before the motor is started, and then the belt load is imparted to the motor gradually after the motor has reached operating speed.

It is an object to provide means for shifting the motor to disconnect the belt load, the act of shifting the motor causing the motor to be started after the belt load has been released, and means for restoring the position of the motor to the normal driving position, a controlled movement in which the belt is gradually tightened as the motor comes into its normal operating position. This operation results in the load of the separator mechanism being gradually placed on the motor through the belt, and the inertia being overcome gradually, rather than by a single rapid surge.

It is a further object to provide a mechanism which automatically starts the motor after it has been disconnected from its belt load, and mechanism operable to stop the motor without the belt being relieved of its load.

It is an object in this connection to provide a cream separator in which the separator bowl is driven by an electric motor, and to provide means to relieve the motor of the driving load of the bowl before the motor is started—thus permitting the motor to come up to full speed—then gradually apply the driving power from the motor to the bowl, and thereby bringing the bowl up to full speed, over a predetermined time period.

It is a further object to provide a cream separator having a bowl driven by pulley means, a movable electric motor having a driving pulley, belt means between the separator bowl pulley and the motor driving pulley, tension means on the motor, normally holding it in position where a driving pulley drivingly engages the belt, means shifting the position of the motor in direction against the tension relieving the belt, and at the same time actuating the switch starter button, starting the motor, and a means slowly returning the motor to its normal operating position tightly against the belt.

It is a further object to provide a starting mechanism for a device of the class described in which a motor is movably mounted for shifting to effect a tightening or releasing of the belt tension, and a lever and cooperating cam for shifting the motor on its mounting, the lever and cam likewise operating the starting switch to start the motor during the operation of releasing the motor belt tension, and a dashpot cooperating with said lever means for shifting the motor under control conditions whereby the motor is returned to its driving position gradually and under regulable time control.

It is a further object to provide the application of a dashpot to a lever and cam operated motor shifting arrangement, which also cooperates with the motor starting switch to start the motor.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

Figure 2:
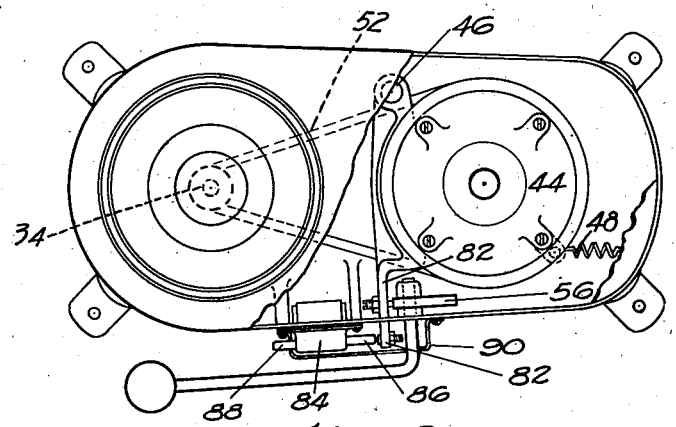
Figure 3:
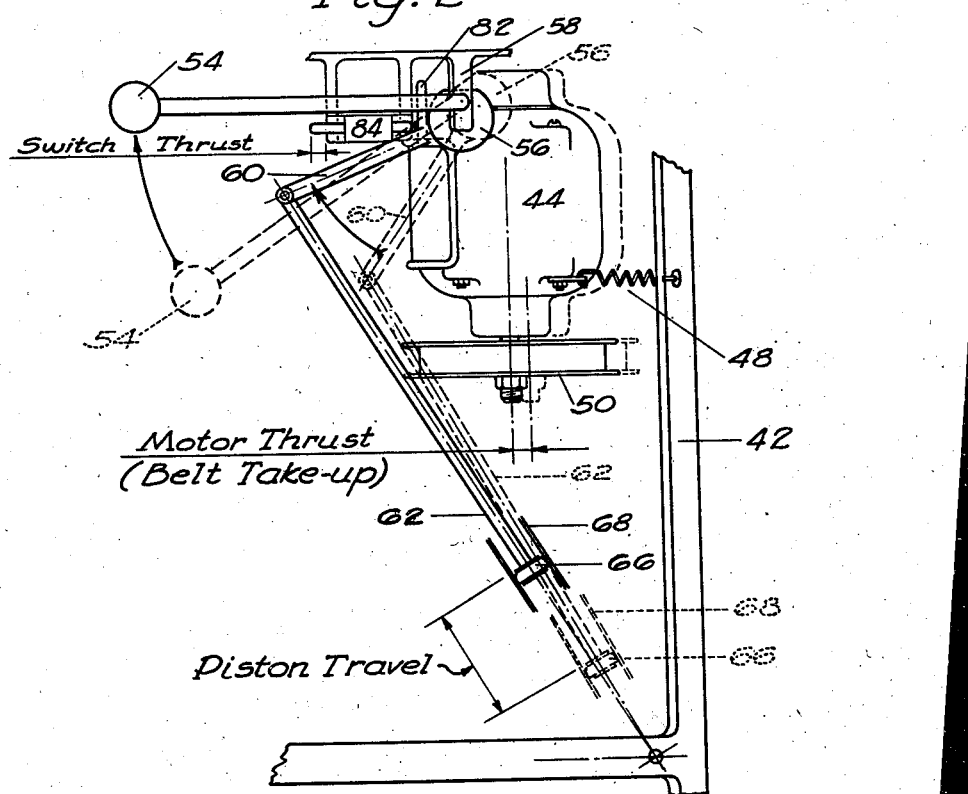

In the drawings:

Figure 1 is a fragmentary side elevational view of a cream separator having the improved starting mechanism described herein; a portion of the housing or casing is broken away to show the operating parts;

Figure 2 is a top plan view, showing the details of the motor mounting and starting mechanism, for which purpose a portion of the housing is broken away; and Figure 3 is a fragmentary side elevational view illustrating the operating mechanism of my device, the motor being shown as disconnected from the belt. The positions of the various parts shown in solid line are the starting positions, and the dotted line positions are the normal operating positions.

Referring in detail to the construction shown in the various figures, and referring first to Figure 1, there is provided a cream separator comprising among other things, the supply can 20 having the faucet and spout combination 22, the supply can supporting bracket 24, the float supporting member 26, the cream cover 28, and the milk cover and spout 30.

There is also provided a separator bowl 32 which usually has considerable weight and therefore considerable starting inertia. The separator bowl 32 is journaled on a spindle 34, which, in turn, is supported in position by any convenient means such as the bracket 36 on which the spindle 34 is rotatably journaled. The spindle 34 has a separator spindle pulley 38 which is drivingly attached to the spindle by any convenient means such as by the usual key means (not shown).

There is provided a separator housing 40 (shown in Figure 1 as partially broken away) and the usual frame 42 on which the housing and the other various parts are mounted.

In the arrangement shown, there is an electric motor 44, which is suspended to the frame by the pivot or hinge means 46, so as to be arcuately swingable about the pivot as an axis within the confines of the separator shell 40, and in a manner moving the motor generally toward, or away from, as the case may be, the spindle 34.

The motor is preferably provided with a spring 48 which exerts tension on the motor tending to move the motor in a direction away from the spindle 34.

The motor 44 has a driving pulley 50, which preferably is for a flat belt. A flat belt is very responsive to slippage and adjustment (and a flat belt is not as likely to stick as is a V-belt due to the wedge action of a V-pulley and V-belt). However, the V-belt or some other types of belts, are readily useable and for the purpose of this application the terms "flat belt," "V-belt," or just "belt" are used interchangeably. The belt 52 extends between the driving pulley 50 and the spindle pulley 38 and provides the driving connection from the motor to the spindle.

Attached to a convenient supporting means, such as the depending stud 58 of the frame 42, is a starting lever 54. A cam 56 is fastened to the lever 54 in an offset position with respect to the center of the cam, in a manner clearly apparent from examination of the figures.

An arm 60 is attached to the cam, or preferably, is integral therewith. This arm 60 is connected to a piston rod 62 leading from a dash pot 64. The dash pot 64 is comprised of the piston rod 62, a piston or plunger with a one way acting cup 66 at or adjacent to the end of the piston rod 62, and a barrel 68 within which the plunger works.

The barrel 68 is (for ease in assembling the device and convenience in manufacture) provided with the top cap 70 through which the piston rod 62 passes, and between which cap 70 and cup 66 there is a spring member 72. The spring member 72 exerts tension on the cup 66 and attached piston rod 62, moving the cup downwardly in the barrel 68. The speed of the movement of the cup 66 can be regulated by controlling the amount of air in the bottom portion of the barrel 68, that is, in the portion below the cup 66. Since the cup 66 is a one way acting cup it allows air to pass the cup on an upward movement of the cup but does not allow air to pass the cup on a downward movement thereof. The barrel 68 is provided with a bottom cap portion, herein shown as comprising the ferrule 73. This ferrule 73 is provided with an orifice 74, the size of which is regulable by moving the thumb bolt 76. The regulation of the size of the orifice 74 will control the rapidity of escape of the air from the barrel below the cup 66.

In its upper portion, that is, the portion above the normal movement of the cup 66, the hole 78 is provided for the transfer of air to and from the barrel 68 on movement of the cup 66. The dash pot 64 is preferably attached to the frame 42 by any convenient means such as is shown at 80. This attaching means should allow the dashpot to move laterally slightly to keep it aligned with the arm 60 which has an arcuate movement about the position where the lever 54 attaches to the depending stud 58, as a radius.

Referring particularly to Figures 2 and 3, it is noted that the support for the motor 44 has an extended bracket member 82, which is normally maintained seated against the cam 56 by reason of the spring tension on the spring 48.

There is provided a switch 84 having electrical connections to the motor 44 and to the source of current (the connections are not shown), which switch is the starting and stopping switch for the motor 44. This switch has the starting button 86 which starts the switch when the button is pressed, and has the stopping button 88 which stops the motor when said stopping button 88 is pressed. The switch is preferably of a conventional toggle type, in which the buttons 86 and 88 comprise one rodlike member extending through the switch. The buttons are here referred to by separate numbers for clarity.

*Operation*

The lever 54, as is clearly apparent from Figure 3, is raised to start the motor. This raising action turns the cam 56 which presses the bracket 82 moving the motor 44 toward the spindle. This movement of the motor 44 will substantially disengage the belt 52 from the driving pulley 50, allowing the motor 44 to run free of any driving load from the spindle. The action of the cam presses the bracket 82 against the starting button 86 of the switch 84, throwing the switch and starting the motor. However, by the time the switch is thrown to a position starting the motor, the motor is disengaged from the belt 52 so that the motor will run without substantial load on the pulley 50. Release of the lever 54 by the operator after it has been raised to disconnect the motor and throw the switch, allows the lever to move downward under the pressure exerted by the spring 72 of the dash pot. This downward movement of the lever is under the time control of the dash pot. As the lever moves downward, the cam 56 allows the motor bracket 82 and the motor 44 to move in a direction away from the spindle 34, such movement being caused primarily by the tension on the spring 48. As the motor 44 and bracket 82 move in a direction away from the spindle 34, the belt 52 is tightened gradually, exerting a starting action through the pulley 38 to the spindle 34 and distributing the starting load over a time period which will not build up excessive power requirements.

The operator of the device merely has to lift the lever 54 to disconnect and start the motor. He then releases the lever 54 and goes on about his other business while the device automatically carries on its normal operations. When the operator is ready to stop the machine, he merely presses the button 88 with his thumb, or otherwise. It will thus be seen that this device is simple, relatively inexpensive, and provides a workable means of controlling the power load.

Referring to Figure 2, the cover 90 is provided over the switch 84 and the exposed portions of the bracket 82. The stopping button 88 protrudes through the cover in a position to be engaged by the operator for stopping the motor, which is accomplished by the simple operation of pressing the button 88 with the thumb or otherwise. However, the starting button 86 is covered so that the motor cannot be started while the belt 52 is engaged in driving relationship. The cover 90 likewise provides a safety element over movable parts and protects both the operator and the parts covered from injury.

The form of the invention herein shown and described presents a preferred embodiment thereof, and delineates its adaption to practical use, but it is to be understood that the present disclosure is to be considered from the illustrative standpoint and not as imposing restriction or limitation on the invention. Reference will be had to the appended claims for a definition of the limits of the invention.

I claim:

1. In a device of the class described, power driving means, starting mechanism for said power driving means, a driven device drivingly connected to said power driving means, releasing means operable to disconnect said power driving and said driven means, said starting mechanism including means operable to start the power driving means, said last mentioned starting means being operable at the time said power driving means and said power driven means are disconnected, whereby the starting load on the power driven means is removed from the power driving means at the time the latter is started.

2. In a device of the class described, power means having starting and stopping means, a belt driven device operated by belt connections to said power means, a means releasing the driving tension on said belt during the initial starting load on said power means and means renewing the driving tension on said belt means after the power means has been started in operation, said last mentioned means operating to distribute the starting load of the driven means gradually over a predetermined time limit.

3. In a device of the class described, power means having starting and stopping means, a belt means, driven means connected to said power means by said belt means, means normally retaining said power means and said belt means in driving relation, means operable to disconnect said power means from driving relation to said belt means, means starting said power means during the time said power means is disconnected from said belt means, and means retarding the re-engaging of said power means and said belt means after they have been disconnected as above described whereby the belt means is gradually re-engaged by said power means.

4. A device of the class described, power means comprising an electric motor having connections to a starting switch, means including a slowly accelerable rotatable inertia device intended to be driven by said power means, pulley and belt connections between said power means and said driven means, means whereby said electric motor may be disengaged from its driving connection with said driven means during the starting of the electric motor and for automatically starting the power means when it is disengaged from said driven means, and means operating to return the power means to driving engagement with said driven means after said power means has reached the operating speed.

5. In a device of the class described, power means having starting and stopping means, a belt driven device operated by belt connections to said power means, a means releasing the driving tension on said belt during the initial starting load on said power means and means for renewing the driving tension on said belt means at a predetermined rate after the power means has been started in operation.

6. A device of the class described comprising in combination a cream separator having a separator bowl mounted for rotation, an electric motor drivingly connected to said separator bowl by belt means, a starting switch for said electric motor, means moving said electric motor to disengage the belt means, said means operating the starting switch when said belt means are disengaged, and means moving said electric motor back to driving engagement with said belt means over a time period under the control of a dash pot and means regulable to control the operation of the dash pot.

7. In a device of the class described, power means such as any electric motor, starting means for said power means, means such as a separator bowl driven by said power means, means whereby said power means and said driven means are disengaged while the power means began operating and until said power means reach normal operating speed, and means operating to gradually engage said power means and said driven means whereby the starting load of said driven means is spread over a substantial period.

8. In a device of the class described, a separator bowl mounted for rotation on a spindle, a spindle pulley drivingly connected to said spindle, an electric motor mounted for swinging movement toward and away from said spindle pulley, a driving pulley driven by said electric motor, belt means between said motor driving pulley and said spindle pulley, means normally retaining said motor driving pulley and said spindle pulley drivingly engaged by said belt means, means loosening said belt means thereby releasing said pulleys from driving operation by said belt means, means starting said motor during the time said belt means are released from driving engagement and means tightening said belt means into driving engagement after said motor is operating.

9. In a power drive, a rotatable inertia device adapted to be accelerated gradually, a driving motor having constant speed characteristics, means for energizing and deenergizing said motor a friction drive interconnecting said motor and inertia device, resilient means associated with said friction drive for preventing slippage thereof, and means for rendering said resilient means inoperative while simultaneously actuating the means for energizing said motor, and means for gradually restoring effectiveness of said resilient means to gradually accelerate said inertia device.

10. In a power drive, a driven element adapted to be accelerated gradually, a driving element adapted to reach full speed quickly, a friction drive interconnecting said driving and driven elements, resilient means acting upon said friction drive to prevent slippage thereof, means for substantially simultaneously setting said driving element in motion and for rendering said resilient means ineffective, and means for gradually restoring the effectiveness of said resilient means to gradually accelerate said driven element.

11. In a power drive, a driven element adapted to be accelerated gradually, a driving element adapted to reach full speed quickly, a variable friction drive interconnecting said driving and driven elements, means for setting said driving element in motion and substantially simultaneously releasing said friction drive to permit said driving element to reach full speed, and means for thereafter gradually increasing said friction drive to gradually accelerate said driven element.

12. In a power drive, a rotatable inertia device adapted to be accelerated gradually, a driving motor having constant speed characteristics, variable driving means between said motor and inertia device, means for rendering said driving means substantially ineffective to accelerate said inertia device and for substantially simultaneously energizing said motor, and means operative upon the energizing of said motor for gradually rendering said driving means effective to gradually accelerate said inertia device.

RICHARD W. MUERLE.